(12) United States Patent
Fan

(10) Patent No.: US 11,419,781 B2
(45) Date of Patent: Aug. 23, 2022

(54) WALKING ASSITANT ROBOT

(71) Applicant: GUANGZHOU ZUBU MEDICAL TECHNOLOGY CO., LTD., Guangzhou (CN)

(72) Inventor: Yifei Fan, Guangzhou (CN)

(73) Assignee: GUANGZHOU ZUBU MEDICAL TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/039,962

(22) Filed: Sep. 30, 2020

(65) Prior Publication Data

US 2021/0016450 A1    Jan. 21, 2021

Related U.S. Application Data

(63) Continuation of application No. PCT/CN2018/084981, filed on Apr. 28, 2018.

(30) Foreign Application Priority Data

Apr. 10, 2018  (CN) .......................... 201810317644.1

(51) Int. Cl.
*A61H 3/04*    (2006.01)
*B25J 11/00*   (2006.01)

(52) U.S. Cl.
CPC .......... *A61H 3/04* (2013.01); *A61H 2003/043* (2013.01); *B25J 11/009* (2013.01)

(58) Field of Classification Search
CPC ........................... A61H 3/04; A61H 2003/043
See application file for complete search history.

(56) References Cited

U.S. PATENT DOCUMENTS 8,663,136 B1 *  3/2014  Alsaffar ................... A61H 3/04
                                                           601/35
11,026,852 B2 *  6/2021  Linon ..................... A61G 5/124
(Continued)

FOREIGN PATENT DOCUMENTS

CA        2595361 A1 *  2/2008  ............... A61H 3/00
CN      203749800 U      8/2014
(Continued)

OTHER PUBLICATIONS

Chinese First Office Action,Chinese Application No. 201810317644.1, dated Mar. 13, 2019 (13 pages).
(Continued)

*Primary Examiner* — David R Dunn
*Assistant Examiner* — Danielle Jackson

(57) ABSTRACT

A walking assistant robot, comprising a main frame body (1), a foot walking mechanism for alternating walking, an auxiliary device (2) and a control device; the walking mechanism, the auxiliary device (2) and the control device are all disposed on the main frame body (1); the control device is connected with the walking mechanism; the auxiliary device (2) includes auxiliary feet (201), and the auxiliary feet (201) are disposed in front of and/or behind the walking mechanism along the walking direction. The foot walking mechanism is used to realize the basic function of the robot walking forward; auxiliary feet (201) are disposed in the walking direction such that the walking mechanism still has, at the moment of foot alternation, multiple supporting points in contact with the ground. Therefore, the mechanism is slip-and-fall-resistant, stable and reliable and guarantees the user safety.

17 Claims, 7 Drawing Sheets

(56) References Cited

U.S. PATENT DOCUMENTS

2014/0196757 A1    7/2014  Goffer
2019/0015273 A1*   1/2019  Linon .................... A61G 5/061

FOREIGN PATENT DOCUMENTS

| | | | |
|---|---|---|---|
| CN | 203749802 U | | 8/2014 |
| CN | 204352127 U | | 5/2015 |
| CN | 103445932 B | | 7/2015 |
| CN | 105411818 A | | 3/2016 |
| CN | 205396267 U | | 7/2016 |
| CN | 205626423 U | | 10/2016 |
| CN | 106963597 A | | 7/2017 |
| CN | 111685979 A | * | 9/2020 |
| DE | 202017001773 U1 | | 5/2017 |
| EP | 3207909 A1 | | 8/2017 |
| JP | 2016039857 A | | 3/2016 |

OTHER PUBLICATIONS

Chinese second office action, Chinese Application No. 201810317644.1, dated Dec. 5, 2019 (12 pages).
Chinese third office action, Chinese Application No. 201810317644.1, dated Jul. 15, 2020 (13 pages).
International Search Report, Chinese Application No. PCT/CN2018/084981, dated Jan. 9, 2019 (6 pages).
European search Report, European Application No. 18914863.8, dated Apr. 23, 2021 (10 pages).

* cited by examiner

WALKING ASSITANT ROBOT

CROSS REFERENCE OF RELATED APPLICATIONS

The present application is a continuation-application of International (PCT) Patent Application No. PCT/CN2018/084981, filed on Apr. 28, 2018, which claims foreign priority of Chinese Patent Application No. 201810317644.1, filed on Apr. 10, 2018, in the National Intellectual Property Administration of China, the entire contents of which are hereby incorporated by reference in its entirety.

TECHNICAL FIELD

The present disclosure relates to the field of assistive walking device technologies, in particular to a walking assistant robot.

BACKGROUND

Traditional walking assistant devices are mainly a wheeled walker. The wheeled walker is greatly affected by a terrain and cannot cross ladders. Moreover, the wheeled walker is prone to slipping when going upwards and downwards, causing a non-negligible safety hazard.

There are also examples researching on foot-type walkers in the current market, mainly for anthropomorphic foot-walking walkers, which applies alternating swings of a front and rear feet to simulate a process of human walking. However, the current foot-type walkers still have safety hazards during the walking process. For example, as the front and rear feet alternate, only the front foot or the rear foot supports the ground. If the user loses balance at this time, there is also a risk of slipping injury. Since users of the walkers are all special people such as the elderly or sick patients, a consequences of slipping or falling may be very serious. Therefore, a stability and reliability of the walker devices are extremely important.

SUMMARY OF THE DISCLOSURE

In order to overcome the shortcomings of the prior art, the present disclosure provides a foot-type walking assistant robot capable of stable walking.

In order to address the above technical issues, the present disclosure provides a walking assistant robot, including: a main frame, a foot-type walking mechanism configured to alternatively walking, an auxiliary device and a control device. The walking mechanism, the auxiliary device and the control device are all disposed on the main frame. The control device is connected to the walking mechanism. The auxiliary device includes an auxiliary leg configured to support the main frame during alternatively walking of the walking mechanism.

In some embodiments, the auxiliary leg is inclined, and a contour formed by the auxiliary leg and the walking mechanism is a triangular structure.

In some embodiments, the auxiliary leg has a substantially L-shaped structure, and a contour formed by the auxiliary leg and the walking mechanism is a trapezoidal structure.

In some embodiments, an end of the auxiliary leg is disposed on the main frame, and the other end of the auxiliary leg is arranged with an auxiliary wheel; a bottom of the auxiliary wheel is flush with that of the walking mechanism.

In some embodiments, the walking mechanism includes support leg sets symmetrically disposed in a left and right direction at both ends of the main frame; each support leg set includes a first support leg, a second support leg, a transmission structure, and a driving unit; the driving unit is connected to the transmission structure; the first support leg and the second support leg are respectively disposed on both sides of the transmission structure via a rotating shaft.

In some embodiments, the transmission structure includes a transmission wheel and a limiting shaft eccentrically disposed on the transmission wheel; an end of the first support leg and that of the second support leg are walking ends; the other end of the first support leg and that of the second support leg are defined with a sliding slot, respectively; the limiting shaft is disposed in the sliding slot.

In some embodiments, each of the first support leg and the second support leg includes an upper support portion and a lower support portion; the upper support portion is disposed on the main frame via the rotating shaft; an end of the upper supporting portion is defined with the sliding slot; the other end of the upper support portion is connected to an end of the lower support portion; the other end of the lower support portion is a walking end; an auxiliary driving unit is disposed at an intersection of the upper support portion and the lower support portion.

In some embodiments, each of the first support leg and the second support leg includes an upper support portion and a lower support portion; the upper support portion is disposed on the main frame via the rotating shaft; an end of the upper supporting portion is defined with the sliding slot; the other end of the upper support portion is connected to an end of the lower support portion; the other end of the lower support portion is a walking end; a connecting rod is arranged between the upper support portion and the lower support portion.

In some embodiments, the main frame further includes a detachable handle.

In some embodiments, the handle is selected from a group including of an ordinary handle, a hand handle, an elbow handle and an axillary handle.

In some embodiments, the lower support portion is capable of rotating relative to the upper support portion via the auxiliary driving unit.

In some embodiments, an end of the connecting rod is connected to the limiting shaft; the other end of the connecting rod is connected to a connecting point at the lower support portion.

In some embodiments, the walking mechanism includes a shaft; the lower support portion rotates relative to the upper support portion via the shaft at the intersection of the upper support portion and the lower support portion.

In some embodiments, the connecting point and the intersection of the upper support portion and the lower support portion are disposed at different positions.

In some embodiments, the detachable handle is connected to the end of the auxiliary leg on the main frame.

In some embodiments, a number of the auxiliary leg is more than one.

In some embodiments, the number of the more than one auxiliary legs is two; one of the plurality of auxiliary legs is disposed in front of and/or behind the first support leg along a walking direction; the other of the plurality of auxiliary legs is disposed in front of and/or behind the second support leg along the walking direction.

In order to address the above technical issues, the present disclosure provides a walking assistant robot, including: a main frame, a left support leg, arranged on a side of the main frame; a right support leg, arranged on another side of the main frame and opposite to the left support leg; a first auxiliary leg, arranged on the main frame and in front of or behind the left support leg along a walking direction; and a second auxiliary leg, arranged on the main frame and in front of or behind the right support leg along a walking direction. The left support leg and the right support leg are configured to alternatively walk. The first auxiliary leg and the second auxiliary leg are configured to support the main frame during the alternatively walking of the left support leg and the right support leg.

In order to address the above technical issues, the present disclosure provides a walking assistant robot, including: a main frame, a pair of support leg sets, arranged on opposite sides of the main frame respectively, wherein each one of the pair of support leg sets comprises a first support leg and a second support leg configured to alternatively walk; and an auxiliary leg, arranged on the main frame and configured to support the main frame during the alternatively walking of the first support leg and the second support leg.

The walking assistant robot based on the above technical features realizes a basic function of walking forward via the foot-type walking mechanism. In the walking direction, the auxiliary leg is arranged such that at the moment of the walking mechanism changing foots, a plurality of supporting points in contact with the ground exist. In this way, a function of anti-slipping may be achieved, which is stable and reliable, thereby ensuring the safety of users.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

In the above drawings, a relationship between numerals and structural elements may be represented as followed.

1. Main frame; 2. Auxiliary device; 201. Auxiliary leg; 202. Auxiliary wheel; 3. First support leg; 301. Upper support portion; 302. Lower support portion; 303. Sliding slot; 304. Auxiliary driving unit; 305. Connecting rod; 306. Shaft; 4. Second support leg; 5. Rotating shaft; 6. Transmission structure; 601. Transmission wheel; 602. Limiting shaft; 7. Ordinary handle; 8. Hand handle; 9. Elbow handle; 10. Axillary handle; 11. Walking mechanism; 12. Control device 13. Driving unit.

DETAILED DESCRIPTION

The technical solutions in the embodiments of the present disclosure are clearly and completely described in the following with reference to the accompanying drawings. It is obvious that the described embodiments are only a part of the embodiments of the present disclosure, but not all embodiments. All other embodiments obtained by those skilled in the art based on the embodiments of the present disclosure without creative efforts are within the scope of the present disclosure.

In the present disclosure, the terms of "contact", "connect", "fix" and the like shall be understood broadly. Unless explicitly defined, they may refer to, for example, a fixed connection, a detachable connection, or an integral. They may also refer to a mechanical connection or an electrical connection. They may also refer to a direct connection or an indirect connection through an intermediate medium. They may also refer to an internal connection of two elements or an interaction relationship of two elements. For those skilled in the art, the specific meanings of the above terms in the present disclosure shall be understood on specific application scenarios.

Further, in the description of the present disclosure, it is to be noted that the terms of "first", "second", and the like are applied for descriptive purposes only, and are not to be construed as indicating or implying relative importance.

Figure 1:
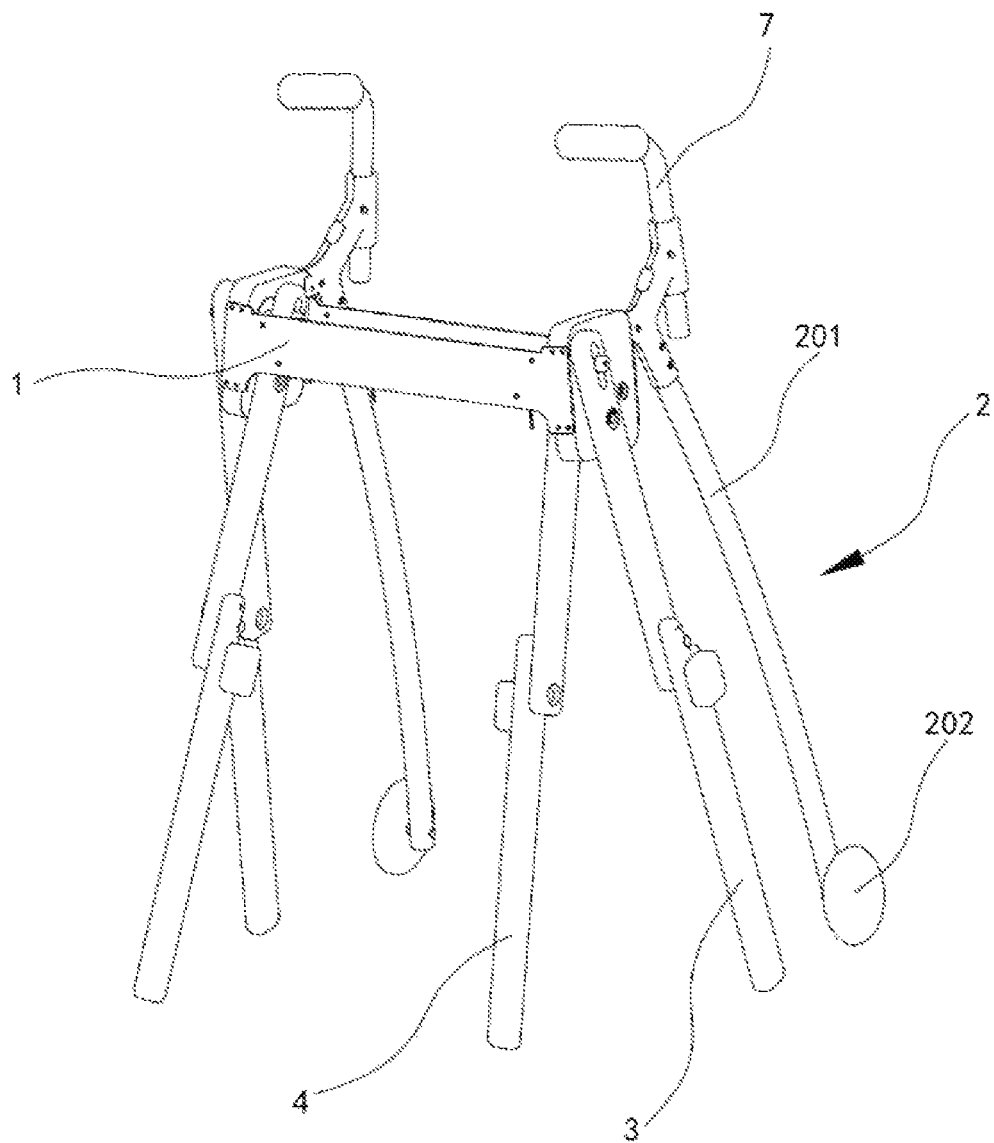
FIG. 1 is a perspective schematic view of a walking assistant robot according to a first embodiment of the present disclosure.
Figure 2:
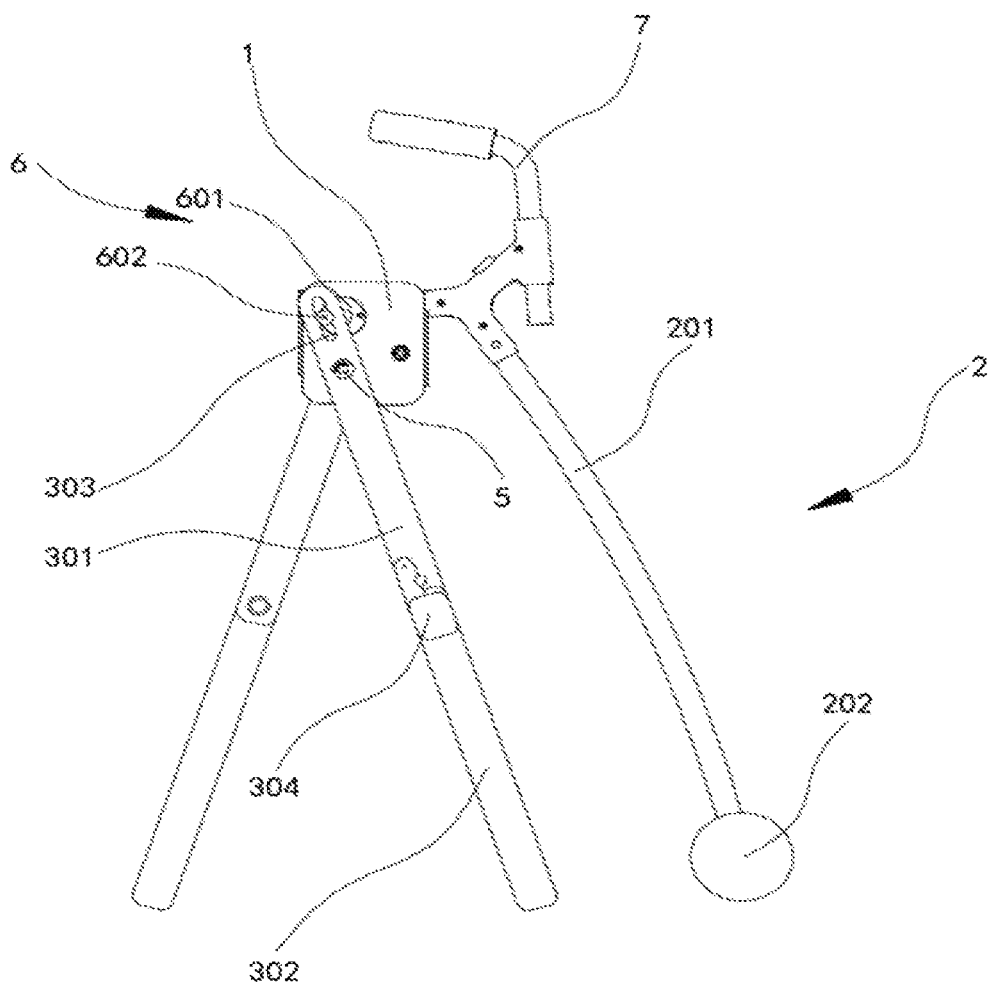
FIG. 2 is a side schematic view of a walking assistant robot according to the first embodiment of the present disclosure.

As shown in FIG. 1 to FIG. 2, the present disclosure provides a walking assistant robot according to a first embodiment of the present disclosure. The walking assistant robot includes a main frame 1, a foot-type walking mechanism 11 for alternate walking, an auxiliary device 2, and a control device 12 (not shown in FIG. 1 or FIG. 2). The walking mechanism 11, the auxiliary device 2, and the control device 12 are all disposed on the main frame 1. The control device 12 is connected to the walking mechanism 11. The auxiliary device 2 includes an auxiliary leg 201 disposed in front of and/or behind the walking mechanism 11 along a walking direction. It should be understood that a number of the auxiliary leg 201 may also be two or more.

The walking assistant robot based on the above technical features realizes a basic function of walking forward via the foot-type walking mechanism 11. In a walking process of the walking mechanism 11, the walking mechanism 11 is required to control the front and rear legs to alternately swing, for achieving the function of walking forward. In the walking direction, the auxiliary leg 201 is arranged such that at the moment of the walking mechanism 11 changing foots, a plurality of supporting points in contact with the ground exist. In this way, a function of anti-slipping may be achieved, which is stable and reliable, thereby ensuring the safety of users.

Further, the auxiliary leg 201 is disposed obliquely. A contour formed by the auxiliary leg 201 and the walking mechanism 11 may be an A-shaped profile or triangular structure. The auxiliary leg 201 may have a rod shape. In this way, the auxiliary leg 201 and the walking mechanism 11 may ensure that at least four support points are in contact with the ground during the walking process, thereby maintaining balance and achieving the function of stabilizing the walking assistant robot.

Further, an end of the auxiliary leg 201 is disposed on the main frame 1, and the other end of the auxiliary leg 201 is arranged with an auxiliary wheel 202. A bottom of the auxiliary wheel 202 is flush with that of the walking mechanism 11. Without the auxiliary wheel 202 arranged, the auxiliary leg 201 and the ground may form a friction, affecting the walking assistant robot to walk forward. A friction between the auxiliary wheel 202 and the ground may transform to a rotation of the wheel, such that the walking assistant robot may smoothly walking forward. The auxiliary wheel 202 enables the walking assistant robot to have advantages of a traditional wheeled walker and a traditional foot-type walker at the same time. That is, the walking assistant robot according to the embodiments of the present disclosure is stable when walking, less limited by the terrain, thereby enlarging arrange of application of the walking assistant robot.

Figure 8:
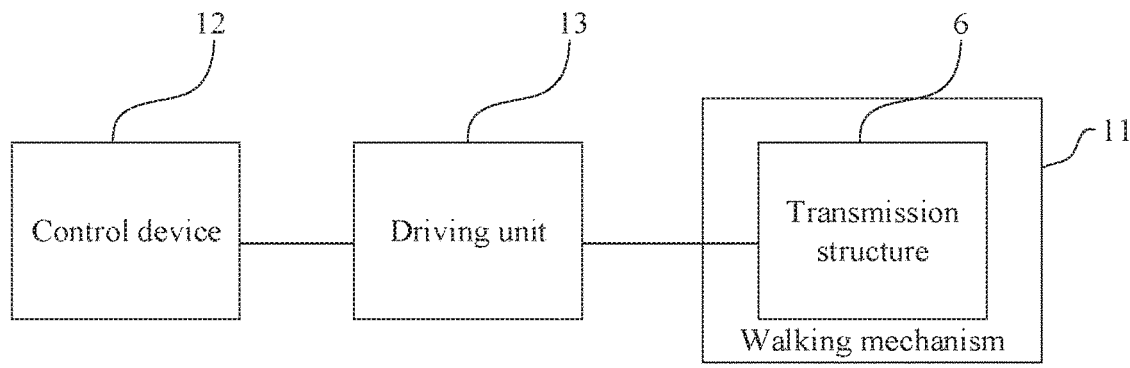
FIG. 8 is a schematic view of a connection relationship between the control device and the walking mechanism.

As shown in FIG. 2, the walking mechanism 11 includes support leg sets symmetrically disposed. Each of the support leg sets includes a first support leg 3, a second support leg 4, a transmission structure 6, and a driving unit 13 (not shown in FIG. 2). In some embodiments, in each of the support leg sets, one of the first or second support leg may be omitted, that is, the walking mechanism 11 may include a left support leg and a right support leg. The driving unit 13 is connected to the transmission structure 6. The first support leg 3 and the second support leg 4 are respectively disposed on both sides of the transmission structure 6 via a rotating shaft 5. The first support leg 3 and the second support leg 4 are symmetrically disposed in front and rear along the walking direction, such that the transmission structure 6 drives the first support leg 3 and the second support leg 4 to swing in opposite directions. In this way, a function of the first support leg 3 and the second support leg 4 being alternately swinging is achieved. It can be understood that the first support leg 3 may be a front leg or a rear leg, and the second support leg 4 may also be may be a front leg or a rear leg, which is not limited herein. It should be understood that a connection relationship between the control device 12 and the walking mechanism 11 can be construed as a relationship between the control device 12 and the driving unit 13, which may be illustrated as FIG. 8.

Further, the first support leg 3 includes an upper support portion 301 and a lower support portion 302. The transmission structure 6 includes a transmission wheel 601 and a limiting shaft 602 eccentrically disposed on the transmission wheel 601. The upper support portion 301 is disposed on the main frame 1 via the rotating shaft 5. An end of the upper supporting portion 301 is defined with a sliding slot 303. The limiting shaft 602 is disposed in the sliding slot 303. The other end of the upper support portion 301 is connected to an end of the lower support portion 302. The other end of the lower support portion 302 is a walking end. An auxiliary driving unit 304 is disposed at an intersection of the upper support portion 301 and the lower support portion 302. It can be understood that the second support leg 4 has the same structure as the first support leg 3. The limiting shaft 602 on the first support leg 3 and the limiting shaft 602 of the second support leg 4 are symmetrically disposed on both sides of the transmission wheel 601. The driving unit 13 is connected to the driving wheel 601 to drive the upper support portion 301 to swing. The auxiliary driving unit 304 simultaneously controls the lower support portion 302 to walk. The lower support portion 302 is capable of rotating relative to the upper support portion 301 via the auxiliary driving unit 304. A knee joint may be formed by the upper support structure 301 and the lower support portion 302, such that a simulated swinging of human front and war legs may be achieved with a high maneuverability and a good performance of crossing barriers and ladders.

Further, the main frame 1 further includes a detachable handle. The users can install different handles according to needs. The detachable handle may be connected to the end of each auxiliary leg on the main frame. As shown in FIG. 2, the handle is an ordinary handle 7.

In a second embodiment, the present embodiment has same features as the first embodiment except for the following features.

Figure 3:
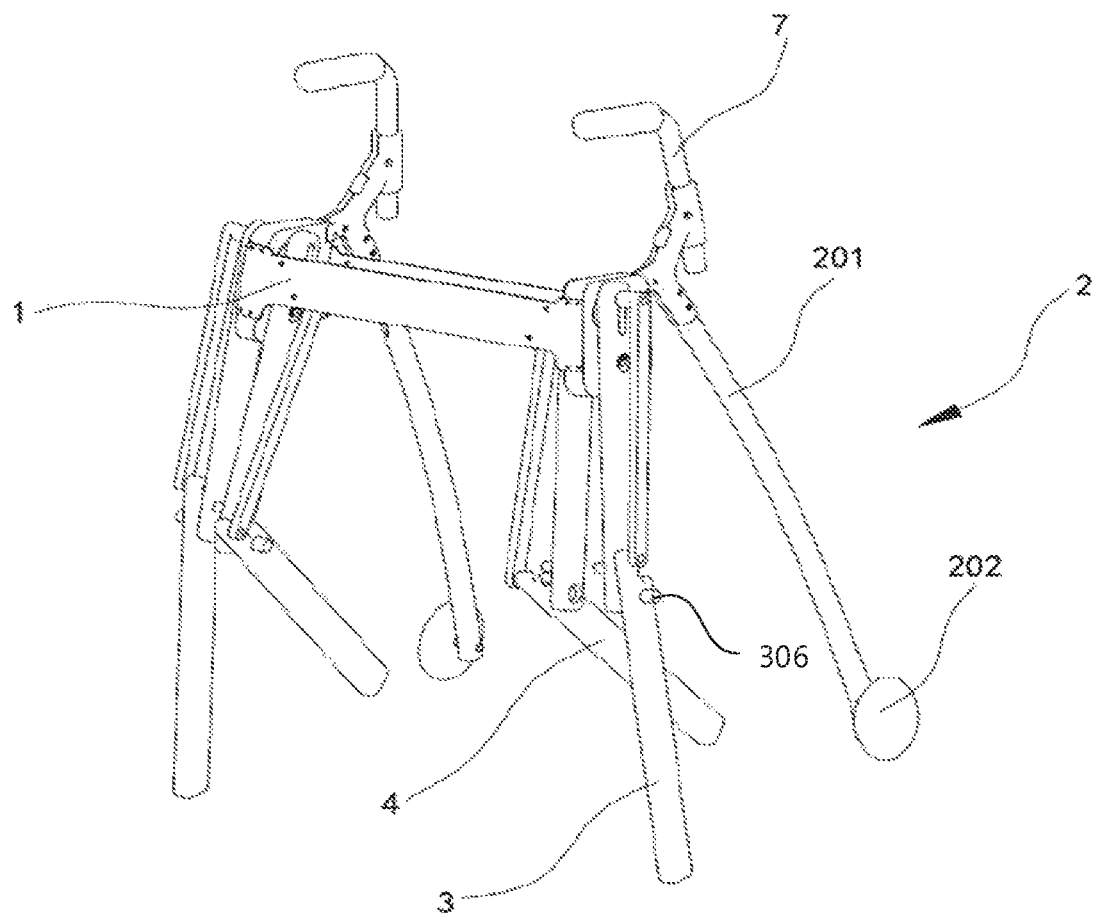
FIG. 3 is a perspective schematic view of a walking assistant robot according to a second embodiment of the present disclosure.
Figure 4:
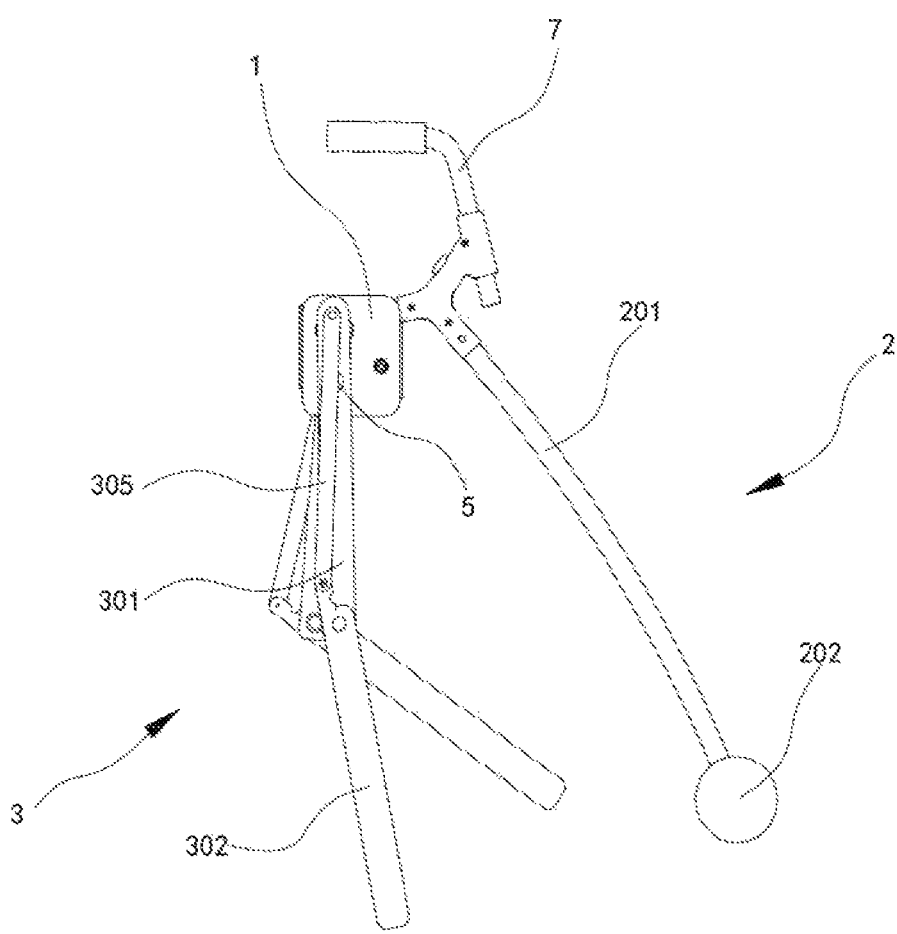
FIG. 4 is a side schematic view of a walking assistant robot according to the second embodiment of the present disclosure.

Combining FIGS. 3-4 with FIGS. 1-2, the first support leg 3 includes an upper support portion 301 and a lower support portion 302. The transmission structure 6 includes a transmission wheel 601 and a limiting shaft 602 eccentrically disposed on the transmission wheel 601. The upper support portion 301 is disposed on the main frame 1 via the rotating shaft 5. An end of the upper support portion 301 is arranged with a sliding slot 303. The limiting shaft 602 is disposed in the sliding slot 303. The other end of the upper support portion 301 is connected to an end of the lower support portion 302. The other end of the lower support portion 302 is a walking end. A connecting rod 305 is arranged between the limiting shaft 602 and the lower support portion 302 (as shown in FIGS. 3 and 4). An end of the connecting rod 305 is connected to the limiting shaft 602. The other end of the connecting rod is connected to a connecting point at the lower support portion. The walking mechanism 11 further includes a shaft 306. The lower support portion 302 rotates relative to the upper support portion 301 via the shaft 306 at an intersection of the upper support portion 301 and the lower support portion 302. The connecting point and the intersection of the upper support portion and the lower support portion may be disposed at different positions. It can be understood that the second support leg 4 has the same structure as the first support leg 3. The limiting shaft 602 on the first support leg 3 and the limiting shaft 602 of the second support leg 4 are symmetrically disposed on both sides of the transmission wheel 601. The driving unit 13 is connected to the driving wheel 601 to drive the upper support portion 301 to swing. As the upper support portion 301 swings, the lower support portion 302 is driven simultaneously to walk by the connecting rod 305. A cooperation of the upper support portion 301 and the lower support portion 302 is more coherent. An autonomy is stronger. A knee joint may be formed by the upper support structure 301 and the lower support portion 302, such that a simulated swinging of human front and rear legs may be achieved with a high maneuverability and a good performance of crossing barriers and ladders. Moreover, a secondary design of control programs is reduced, and a design cost is thus saved.

In a third embodiment, the present embodiment has the same features as the first embodiment except for the following features.

Figure 5:
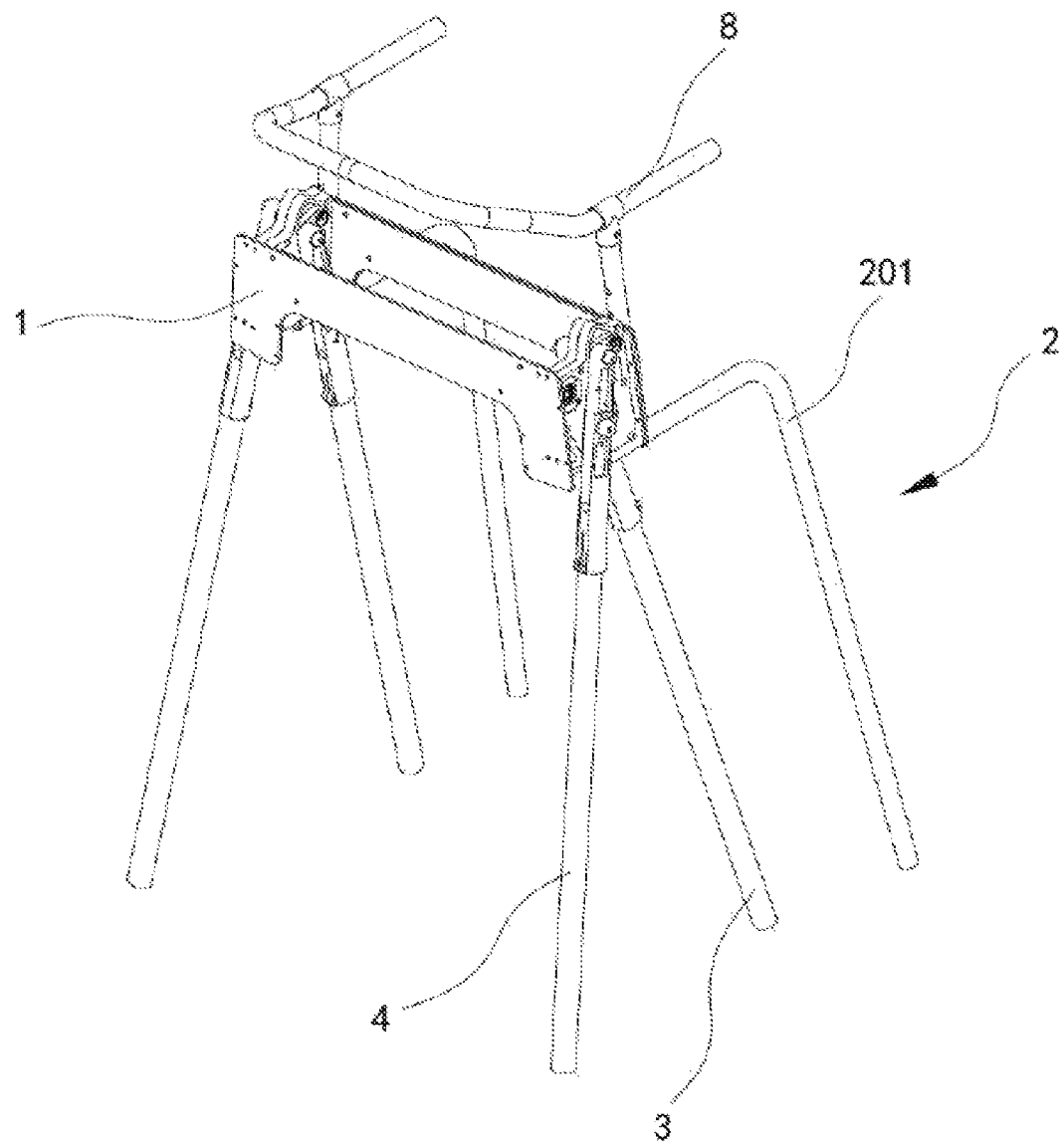
FIG. 5 is a perspective schematic view of a walking assistant robot according to a third embodiment of the present disclosure.

As shown in FIG. 5, the auxiliary leg 201 has a substantially L-shape. A contour formed by the auxiliary leg 201 and the walking mechanism 11 may be a gate-shaped or a trapezoidal structure. The auxiliary leg 201 may have a rod shape. In this way, the auxiliary leg 201 and the walking mechanism 11 may ensure that at least four support points are in contact with the ground during the walking process, thereby maintaining balance and achieving the function of stabilizing the walking assistant robot.

Further, as shown in FIG. 5, the handle is a hand handle 8. The users can install different handles according to needs.

In a fourth embodiment, the present embodiment has the same features as the first embodiment except for the following features.

Figure 6:
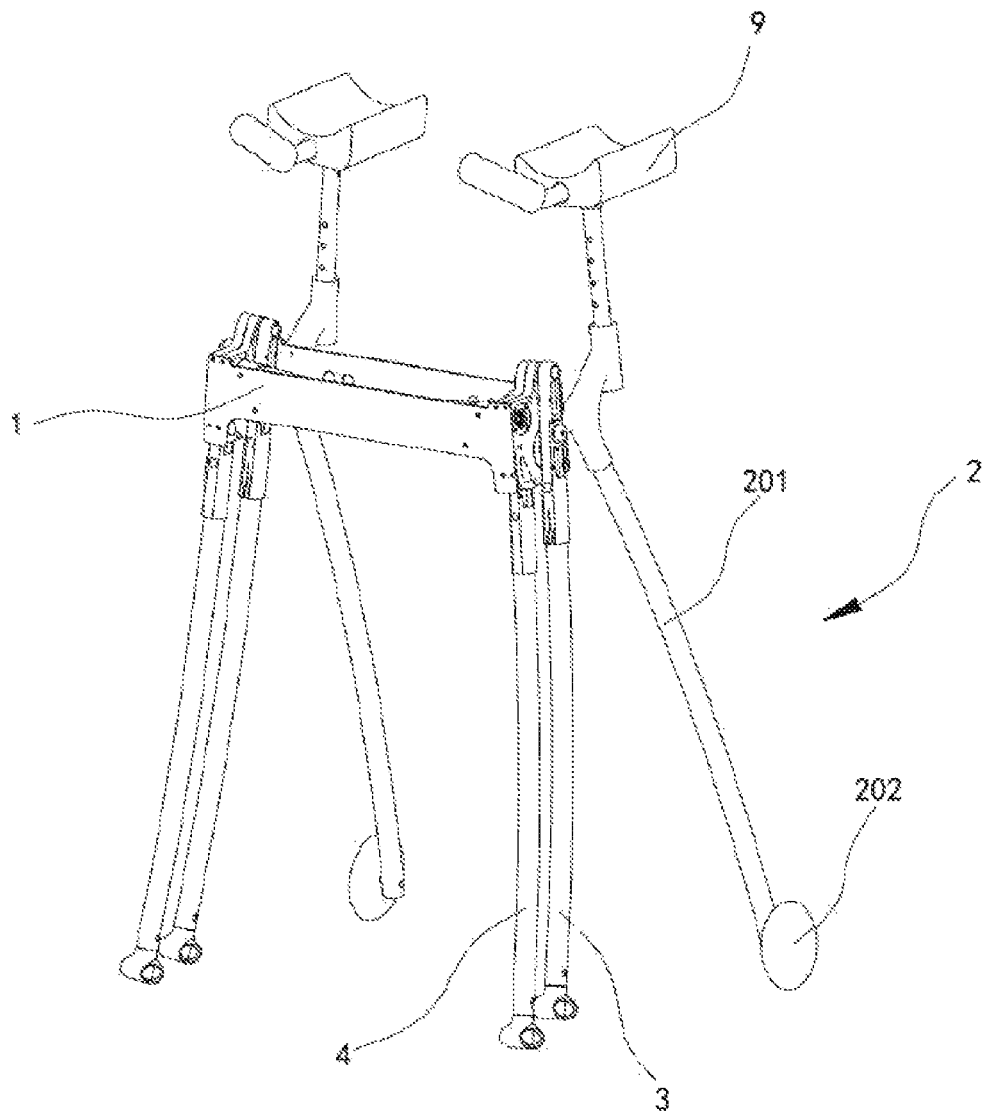
FIG. 6 is a perspective schematic view of a walking assistant robot according to a fourth embodiment of the present disclosure.

As shown in FIG. 6, the handle is an elbow handle 9. The users can install different handles according to needs.

In a fifth embodiment, the present embodiment has the same features as the first embodiment except for the following features.

Figure 7:
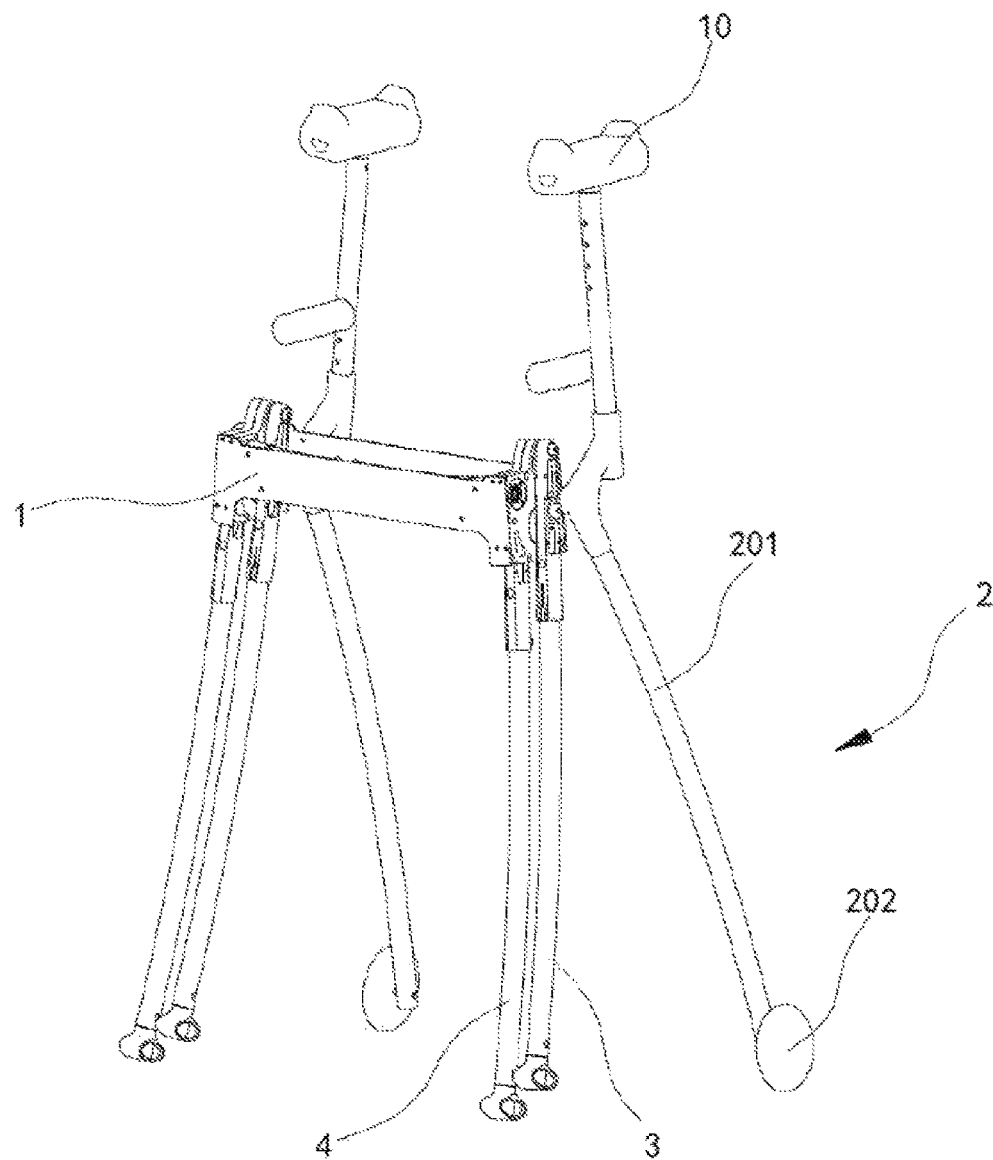
FIG. 7 is a perspective schematic view of a walking assistant robot according to a fifth embodiment of the present disclosure.

As shown in FIG. 7, the handle is an axillary handle 10. The users can install different handles according to needs.

It can be understood that a shape of the auxiliary leg 201, types of the auxiliary wheel 202 and the handle may be arranged on the foot-type walking mechanism 11 in various combinations, which the present disclosure has no particular limitation thereon. The structural designs are all within the scope of the present disclosure and will not be described herein.

In summary, the walking assistant robot described in the embodiments of the present disclosure is applied with a structure formed by the auxiliary leg 201 or the auxiliary wheel 202, such that the walking assistant robot has a plurality of supporting points in contact with the ground during the alternate walking process. In this way, a danger of slipping may be avoided or limited, a walking range is enlarged, a limitation of terrains is reduced, and a stability and balance is ensured achieving a safety performance.

It should be noted that the above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. A walking assistant robot, comprising: a main frame, a walking mechanism configured to walk, an auxiliary device and a control device; wherein the walking mechanism, the auxiliary device and the control device are all disposed on the main frame; the control device is connected to the walking mechanism; the auxiliary device comprises an at least one auxiliary leg configured to support the main frame during walking of the walking mechanism, and the at least one auxiliary leg is disposed in front of or behind the walking mechanism along a walking direction;

wherein the walking mechanism comprises two support leg sets disposed symmetrically; one of the two support leg sets is disposed at a left end of the main frame, and the other one of the two support leg sets is disposed at a right end of the main frame; each support leg set comprises a first support leg, a second support leg, a transmission structure, and a driving unit; the driving unit is connected to the transmission structure; the first support leg and the second support leg are respectively disposed on both sides of the transmission structure via a rotating shaft;

wherein the transmission structure comprises a transmission wheel and a limiting shaft eccentrically disposed on the transmission wheel; an end of the first support leg and an end of the second support leg are walking ends; each of the other end of the first support leg and the other end of the second support leg defines a sliding slot; the limiting shaft is disposed in the sliding slot.

2. The walking assistant robot according to claim 1, wherein each of the at least one auxiliary leg is inclined, a contour formed by each of the at least one auxiliary leg and the walking mechanism is a triangular structure.

3. The walking assistant robot according to claim 2, wherein an end of each of the at least one auxiliary leg is disposed on the main frame, the other end of the each of the at least one auxiliary leg is arranged with an auxiliary wheel.

4. The walking assistant robot according to claim 3, wherein a bottom of the auxiliary wheel is flush with that of the walking mechanism.

5. The walking assistant robot according to claim 1, wherein each of the at least one auxiliary leg has a substantially L-shaped structure, a contour formed by each of the at least one auxiliary leg and the walking mechanism is a trapezoidal structure.

6. The walking assistant robot according to claim 1, wherein each of the first support leg and the second support leg comprises an upper support portion and a lower support portion; the upper support portion is disposed on the main frame via the rotating shaft; an end of the upper supporting portion defines the sliding slot; the other end of the upper support portion is connected to an end of the lower support portion; the other end of the lower support portion is a walking end.

7. The walking assistant robot according to claim 6, wherein an auxiliary driving unit is disposed at an intersection of the upper support portion and the lower support portion; the lower support portion is capable of rotating relative to the upper support portion via the auxiliary driving unit.

8. The walking assistant robot according to claim 6, wherein a connecting rod is arranged between the upper support portion and the lower support portion.

9. The walking assistant robot according to claim 8, wherein an end of the connecting rod is connected to the limiting shaft; the other end of the connecting rod is connected to a connecting point on the lower support portion.

10. The walking assistant robot according to claim 9, wherein the walking mechanism comprises a shaft; the lower support portion rotates relative to the upper support portion via the shaft at the intersection of the upper support portion and the lower support portion.

11. The walking assistant robot according to claim 10, wherein the connecting point and the intersection of the upper support portion and the lower support portion are disposed at different positions.

12. The walking assistant robot according to claim 6, wherein the number of the at least one auxiliary leg is more than one.

13. The walking assistant robot according to claim 12, wherein the number of the at least one auxiliary leg is two; one of two auxiliary legs is disposed in front of or behind the one of the support leg sets along the walking direction; the other of the two auxiliary legs is disposed in front of or behind the other of the support leg sets along the walking direction; wherein the two auxiliary legs are either both disposed in front of or both disposed behind the support legs sets.

14. The walking assistant robot according to claim 1, wherein the main frame further comprises a detachable handle.

15. The walking assistant robot according to claim 14, wherein the detachable handle is selected from a group comprising a hand handle, an elbow handle and an axillary handle.

16. The walking assistant robot according to claim 14, wherein the detachable handle is connected to an end of each of the at least one auxiliary leg on the main frame.

17. A walking assistant robot, comprising:

a main frame, a pair of support leg sets, arranged on opposite sides of the main frame respectively, wherein each one of the pair of support leg sets comprises a first support leg and a second support leg configured to walk; and an auxiliary leg, arranged on the main frame and configured to support the main frame during walking of the first support leg and the second support leg;

wherein each one of the pair of support leg sets further comprises a transmission structure and a driving unit the driving unit is connected to the transmission structure; the first support leg and the second support leg are respectively disposed on both sides of the transmission structure via a rotating shaft;

wherein the transmission structure comprises a transmission wheel and a limiting shaft eccentrically disposed on the transmission wheel; an end of the first support leg and an end of the second support leg are walking ends; each of the other end of the first support leg and the other end of the second support leg defines a sliding slot; the limiting shaft is disposed in the sliding slot.

\* \* \* \* \*